Dec. 10, 1929. J. L. WHEELER 1,738,546
FABRIC MEASURING AND COST COMPUTING MACHINE
Filed July 30, 1923   3 Sheets-Sheet 1

Inventor:
John L. Wheeler.
By Bruce A. Elliott
Attorney.

Dec. 10, 1929.   J. L. WHEELER   1,738,546
FABRIC MEASURING AND COST COMPUTING MACHINE
Filed July 30, 1923   3 Sheets-Sheet 2
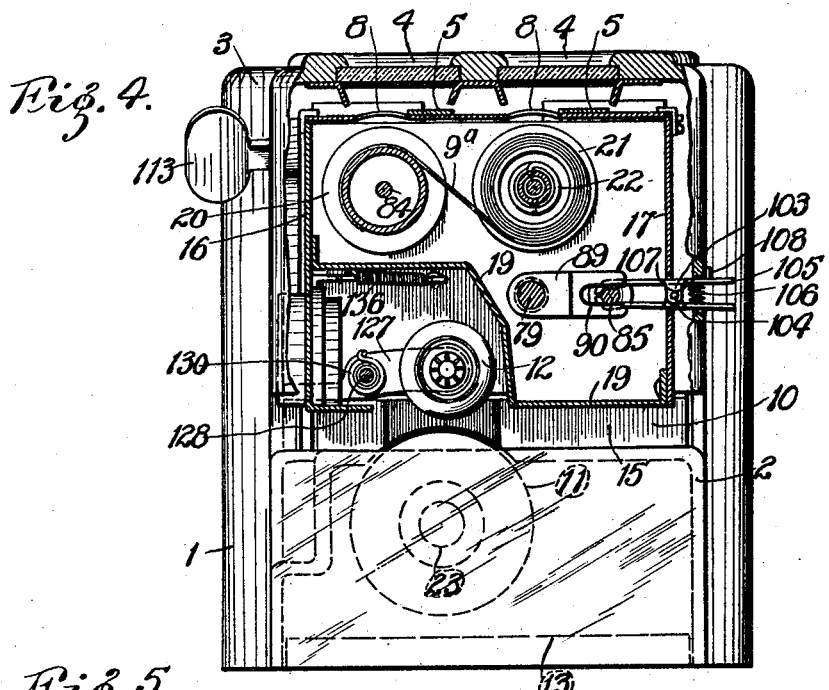
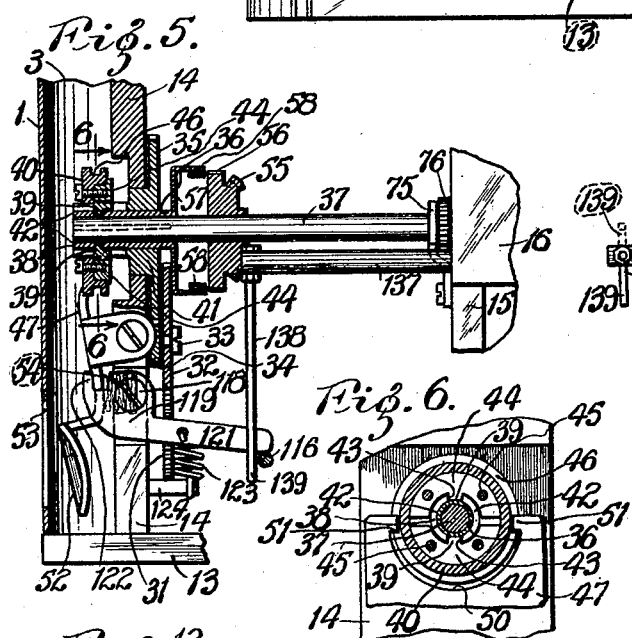
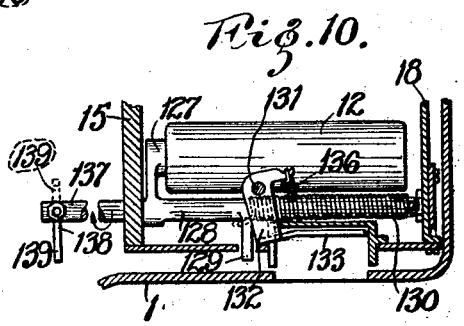
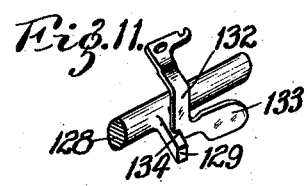
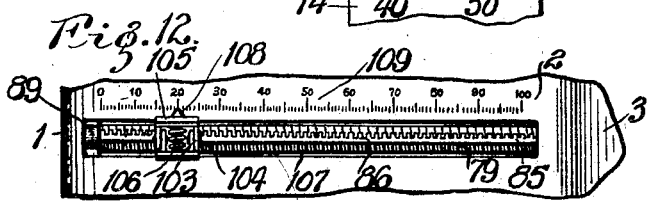
Inventor:
John L. Wheeler
By Bruce S. Elliott
Attorney.

Dec. 10, 1929.  J. L. WHEELER  1,738,546
FABRIC MEASURING AND COST COMPUTING MACHINE
Filed July 30, 1923  3 Sheets-Sheet 3
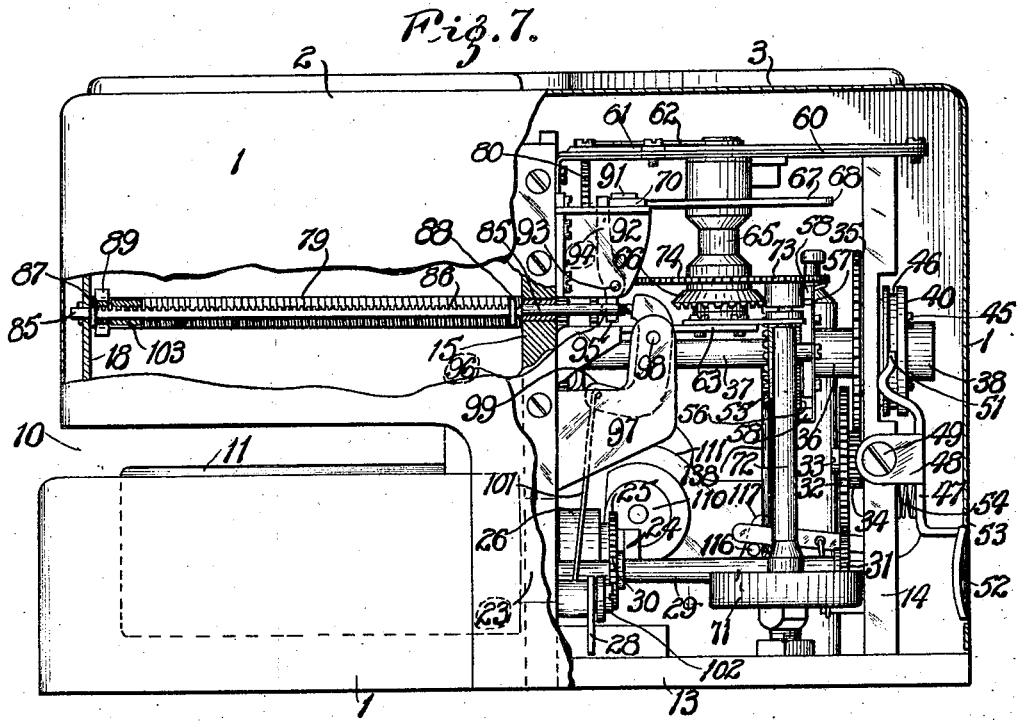
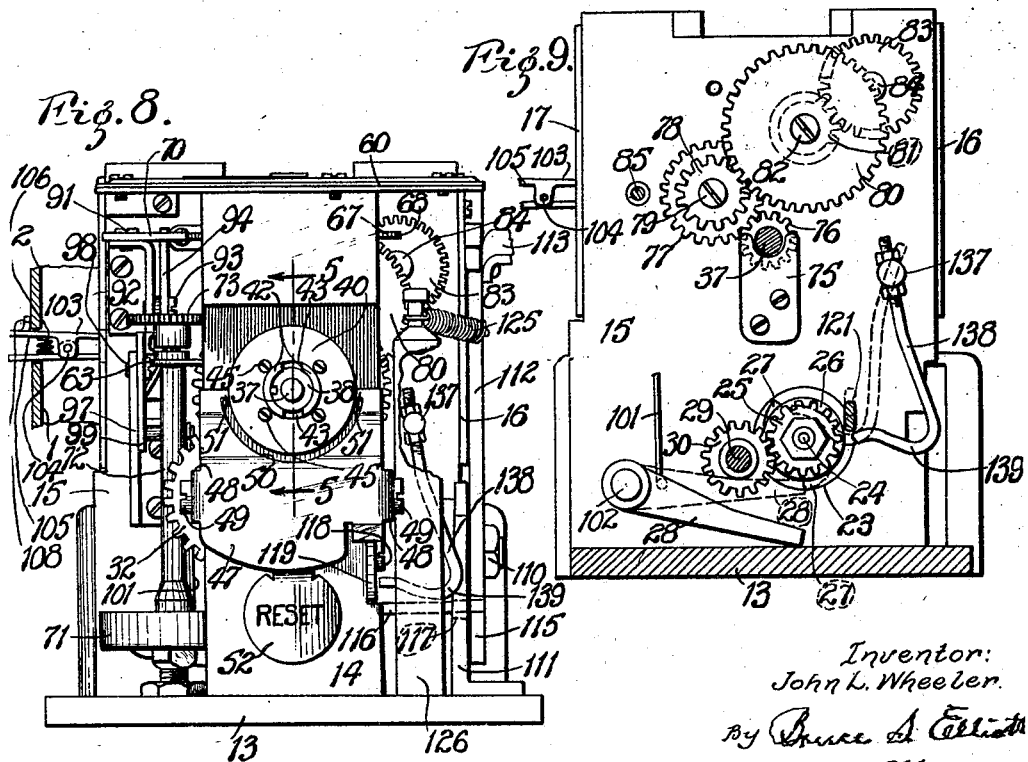
Inventor:
John L. Wheeler.
By Bruce A. Elliott
Attorney.

Patented Dec. 10, 1929

1,738,546

UNITED STATES PATENT OFFICE

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE

FABRIC-MEASURING AND COST-COMPUTING MACHINE

Application filed July 30, 1923. Serial No. 654,631.

The general object of the present invention is to provide a fabric measuring machine which shall be capable of indicating measurements and costs of fabric measured up to a given length, say, twelve yards, and beyond such length to indicate measurement only, the purpose being to enable the machine to be used in making retail sales and also for measuring great lengths of fabric up to, say, one-hundred yards. This added feature of length indication of a great number of yards enables the machine to be used in taking stock, or, as a wholesale machine, in measuring bolts of goods.

Other objects of the invention relate to features of construction and combinations of parts which not only enable the broad object of the invention to be obtained, but which co-operate to produce a machine having many features facilitating its use and adding to its accuracy and efficiency both when used as a measuring and cost computing machine and as purely a measuring machine.

Stated more in detail, such objects of the invention comprise the provision of an automatic reset co-operating with a clutch which includes, in its specific embodiment, a pawl for holding the clutch open until the machine returns to the zero position; the provision of a pin or actuator on the knife lever for releasing the pawl to permit the re-engagement of the clutch; the provision of an arm on the presser roll frame which also releases the pawl to permit re-engagement of the clutch when the knife is not operated; the provision of improved means operating automatically to prevent further movement of the mechanism at the end of the total yardage of the machine; the provision of improved means for arresting the movement of the machine in the resetting operation at the zero position; the provision of adjustable stop mechanism which may be set to prevent further movement of the mechanism at any given number of yards less than the total capacity of the machine; and finally, the provision of a novel chart and of a window co-operating therewith, the chart operating through a portion of its length to indicate at said window the length of goods measured, and at another point on the face of the machine, the cost of the length of goods measured at a given price per yard, and through the remainder of its length, the length of goods measured only, through said window.

The invention is illustrated in the accompanying drawing, in which—

Figure 4 is a view partly in end elevation and partly in section viewed from the right of Figure 1;

Figure 5 is a longitudinal sectional view through the clutch mechanism taken on the line 5—5 of Figure 8;

Figure 6 is a section on the line 6—6 of Figure 5;

Figure 7 is a view similar to Figure 2 but viewed from the opposite side;

Figure 8 is an end elevation of the machine with the casing removed viewed from the left of Figure 2;

Figure 9 is a cross-sectional view taken on the line 9—9 of Figure 2;

Figure 10 is a broken sectional elevation of the presser roll and frame showing the latter provided with an arm for actuating the reset mechanism;

Figure 11 is a perspective view of the reset lever for releasing the presser roll frame; and Figure 12 is a view of a portion of one side of the casing corresponding to that shown in Figure 7 illustrating the adjustable means for stopping the movement of the machine at any desired point in the measuring operation.

Figure 1:
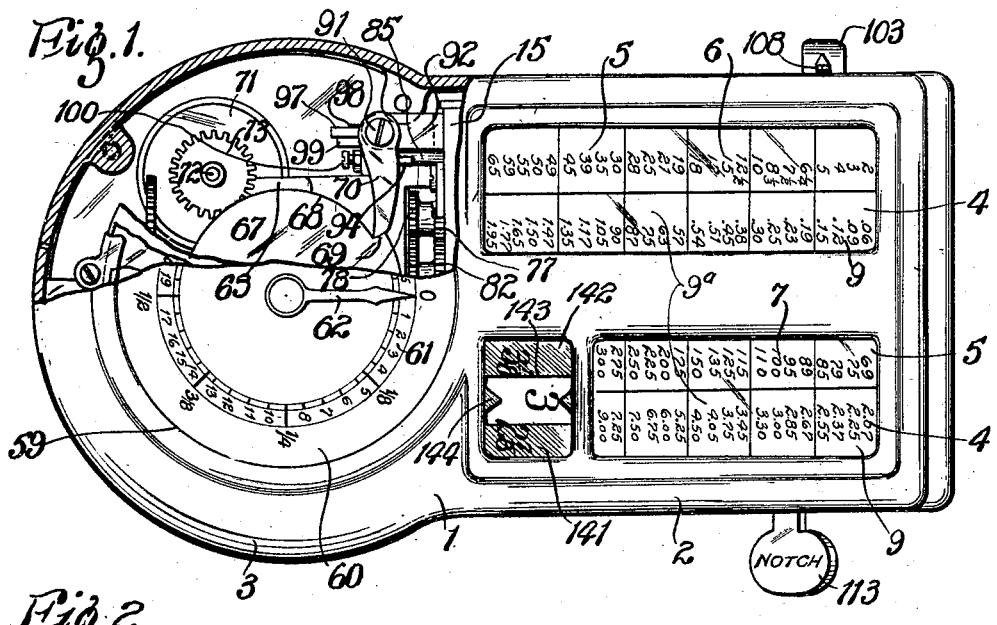
Figure 1 is a plan view of a machine constructed according to my invention, a portion of the face plate being broken away to illustrate the interior mechanism.

Referring now to the drawings, the numeral 1 indicates the casing of the machine which comprises a rectangular portion 2 and a circular portion or end 3, the rectangular portion 2 having longitudinally disposed openings 4 in its upper side, at one side of each of which is arranged a strip 5 containing a price-per-yard scale, the second scale being a continuation of the first, and said scales, in the form of columns of figures, being indicated, respectively, by the numerals 6, 7. Each opening 4 is covered by a curved glass panel 8 (Figure 4) through which appear numbers 9 on a chart 9ª as the measuring operation hereinafter described, proceeds. The rectangular portion 2 of the frame is provided with an open space or throat 10 (Figures 2 and 7) into which projects the upper portion of a measuring roller 11 with which co-operates a presser roller 12 (Figures 4 and 10) pivotally mounted in the frame of the machine above the throat 10. The circular portion 3 of the casing houses the actuating mechanism, as shown more clearly by Figures 1, 2 and 7, which is mounted on and within a frame comprising, principally, a base plate 13, (Figures 2 and 7), an end plate 14, and an intermediate plate 15 constituting the main supporting plate of the mechanism of the machine, and which is parallel with the plate 14 and vertically disposed substantially in a plane dividing the rectangular portion 2 from the circular portion 3 of the casing. Supported on the plate 15 are side plates 16, 17 (Figure 4), an end plate 18 (Figure 7), and a bottom plate 19 of irregular formation, the plates 16, 17, 18 and 19 forming a supplemental casing housing and chart rollers 20, 21 (Figure 4) on which the chart 9ª is mounted. Of these, the roller 21 normally has the chart 9ª wound thereon, and the latter is unwound from said roller onto the roller 20 against the resistance of a torsion spring 22 which is the main actuating spring of the mechanism operating to return the chart and the indicators, hereinafter referred to, to the zero position when certain clutch mechanism is released for the purpose.

Figure 2:
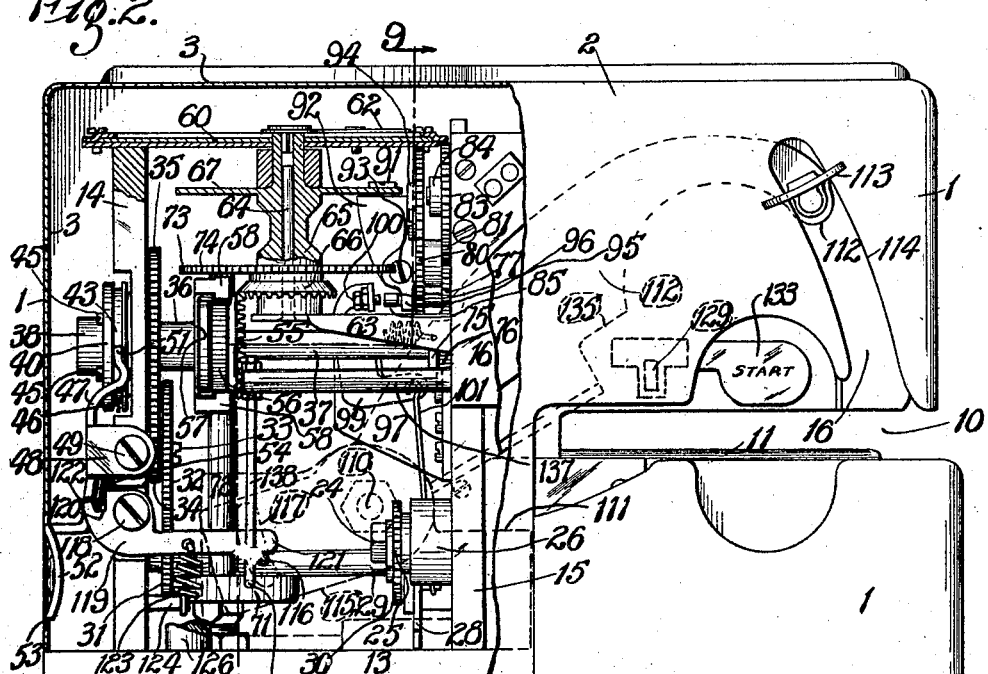
Figure 2 is a side view of the machine, a part of the casing being broken away to illustrate the mechanism on the interior, the latter being shown partly in elevation and partly in section.

The actuating mechanism which, as stated, is housed in the circular portion 3 of the casing of the machine, is operated from the measuring roller 11 as goods are pulled over the same through slot 10. To this end, the said measuring roller is rotatably mounted at one end in the main frame plate 15 through the medium of a cylindrical bearing 23 (Figures 7 and 4) and roller shaft 24 on the end of which is fixedly secured a gear wheel 25. Secured on the stub shaft 24 between the gear 25 and the face of the plate 15, is a collar 26 Fig. 2 provided on its periphery with a shoulder 27 (Figure 9) with which co-operates a pivoted dog 28, hereinafter described. The indicating mechanism and the chart are operated from the gear wheel 25 on the shaft of the measuring roller and the parts involved in this actuating or driving mechanism will now be described.

Referring to Figures 2, 7 and 9, the numeral 29 indicates a shaft which is rotatably mounted at its ends in the plates 14 and 15, and has fixedly secured thereon near one end, a gear wheel 30 which meshes with the gear wheel 25. At its opposite end, the shaft 29 has fixedly secured thereon a pinion 31 Figs. 2 and 7 which meshes with a gear wheel 32 mounted on a stub shaft 33 on plate 14, the gear wheel 32 carrying a fixed pinion 34 which meshes with a gear wheel 35. The gear wheel 35 is splined on a sleeve 36 which in turn is slidably mounted in said gear, and the latter is rotatably mounted in the plate 14. Rotatably mounted at one end in the plate 15 and at its other end extending through the sleeve 36 to the outer side of plate 14 is a shaft 37 Fig. 5. On its outer end beyond the plate 14, the sleeve 36 is provided with a head 38 formed by annularly recessing the said sleeve, and behind this head engage tongues 39, (Figure 6) carried by a clutch disk 40. The gear wheel 35 has a circular offset bearing portion 41 (Figure 5) on its outer face, by means of which it is rotatably mounted in the plate 14, and projecting outwardly from the bearing 41 are two arc-shaped members 42 on which the clutch disk 40 is slidably mounted and which provide between them spaces 43 (Figs. 6 and 8) through which the tongues 39 project to engage behind the head 38. The part that I term the clutch disk 40 is in reality in two parts, the tongues 39 being formed on segment-shaped members 44 to which the outer face of the clutch disk 40 is secured by means of screws 45. The clutch disk 40 is provided with a circumferential groove 46. To operate the clutch disk 40 I provide a plate 47 Fig. 5 having at its sides, ears 48 (Figure 7) by means of which it is pivotally mounted on the plate 14 through screws 49 (Figure 8) inserted in said ears and engaging in the screw-threaded apertures in opposite edges of plate 14. The upper edge of this plate is recessed, as indicated at 50, Figs. 6 and 8, to encircle the clutch disk 40 and the upper edge portions of the recess are provided with inwardly extending tongues 51 which engage in the groove 46 of the clutch disk. The lower edge of the plate is provided with a projecting member or thumb plate 52 which, as shown in Figures 2 and 7, is positioned in an opening 53 at the rear side of the machine at the bottom of the circular portion 3 of the casing, thus being readily accessible to the operator. This thumb plate is preferably provided with the word "Reset", as shown in Figure 8, to indicate that this plate is to be pressed to return the machine to the zero position. Between the plate 47 and the frame plate 14 I interpose below the point of pivotal mounting of said plate at 49, a coil spring 54 (Figure 7) which normally presses the thumb plate 52 outward and the clutch disk 40 inward. Fixedly secured on the shaft 37 is a bevel gear 55 which has formed integral with it, a knurled disk 56. Secured on the end of the sleeve 36 opposite to that having the clutch disk 40 is a disk 57 having secured at a plurality of points around its periphery, clutches 58 Figs. 2 and 5 which extend outward from the edge of disk 57 and then inward at right angles, so that when the sleeve 36 is moved inward to move the disk 57 toward the knurled disk 56, the clutches 58 will engage the periphery of the latter to cause the shaft 37 to turn with the sleeve 36 and gear wheel 35 splined thereon.

Referring to Figure 1, the circular portion 3 of the casing has a glass covered opening 59 through which appears a dial plate 60 having a circular scale thereon sub-divided to show fractions of a yard, one-eighth, one-fourth, three-eighths, etc., and also being sub-divided to show inches; said sub-divisions being indicated by numbers, as indicated at 61. The numeral 62 indicates a pointer which travels over the scale on the dial 60. This pointer is driven from the bevel gear 55 through the following mechanism.

Mounted on a supplemental frame plate 63 (Figure 2) secured to the frame plate 15, is a vertically disposed pin 64. Rotatably mounted on this pin and supported by plate 63 is a sleeve 65 having mounted on its lower end a bevel gear 66 in mesh with the bevel gear 55. The upper end of sleeve 65 projects through the dial plate 60 and the pointer 62 is suitably secured to the projecting end of said sleeve.

In order to arrest the movement of the machine when the parts have returned to the zero position, I mount on the sleeve 65 a cam disk 67 (Figures 1 and 2) having a cam surface 68 and a shoulder 69 which is adapted to be engaged by a dog 70 which is operated in a manner to be later described. I also provide a governor to prevent excessive speed of the parts when being returned to zero. The casing of the governor is indicated generally by the numeral 71 (Figures 7 and 8), the governor proper (not shown) being on the lower end of a shaft 72, which is provided at its upper end with a pinion 73 which is in mesh with a gear 74 mounted on the sleeve 65 above the bevel gear 66 thereon.

The chart 9ª containing the columns of figures, 9, is adapted to be wound onto the roller 20 by the rotation of shaft 37. The chain of gears for this purpose will now be described.

Referring to Figure 5, the shaft 37 is shown supported at its inner end in a bracket 75 mounted on the intermediate frame plate 15. Secured on the end of the shaft is a pinion 76. Referring to Figure 9, the pinion 76 is shown in mesh with a gear 77 which has fixedly secured thereto a pinion 78, the two being fixedly secured on the end of a lead screw 79, to be later referred to. The pinion 78 is in mesh with a gear wheel 80 which has fixedly secured to it a pinion 81, the two being mounted on a stub shaft 82, and pinion 81 is in mesh with a gear 83 which is fast on the end of a shaft 84 of the chart roller 20. Thus when the clutch members 57 and the knurled disk 56 are in engagement, the shaft 37 will be turned as the measuring roller 11 is rotated by engagement therewith of the fabric pulled through the machine, and shaft 37, through the bevel gear 55, will operate the pointer 62, and through the gear 76 will rotate the roller 20 to cause the chart 9 to display its columns of figures under the openings 4.

As the measuring proceeds, the spring 22 on chart roller 21 will be placed under continuously increasing pressure although its strength can never be sufficient to move the mechanism in the reverse direction as the gearing is proportioned to make this impossible, so that the machine will stop and the mechanism remain fixed at any point in the measuring operation up to the capacity of the machine.

As thus far described, assuming the measuring operation to have been completed and the goods removed from the machine, the operator, desiring to return the mechanism to zero, will simply put his thumb on the plate 52 and press it inward which will operate to move clutch disk 40 and sleeve 36 outward carrying the clutch member 57 away from the clutch member 56 so as to release the engagement between shaft 37 and the gear 35 which connects with the chain of gears to the measuring roller, and the power of spring 22 is now sufficient to rotate shaft 37 in a reverse direction, which will simply rotate in the sleeve 36 without turning it, this movement re-winding the chart on roller 21 and through the medium of bevel gear 55, returning the pointer 62 to the zero position where it is stopped by engagement of the shoulder 69 with the dog 70.

The mechanism by which the dogs 28 and 70 are actuated, the first to arrest the movement of the machine at the limit of its capacity to prevent tearing the end of the chart from the roller 21, and the other to arrest the movement of the machine at the zero position, will now be described.

Slidably mounted in the end plate 18 and the frame plate 15 is a bar 85 (Figures 4, 7 and 12) which has an intermediate portion provided with rack teeth, as indicated at 86, and the purpose of which will presently appear. Mounted on either end of the bar 85 adjacent to the plates 18 and 15, are collars 87 and 88, respectively. Extending parallel with the bar 85 is the lead screw 79, previously referred to, which has its end bearings also in the plates 18 and 15 (Figures 4, 7, 9 and 12) and is adapted to be rotated from the pinion 76 by the gear 77, as shown in Fig. 9, said gear being secured on the end of the shaft. Thus the lead screw 79 is turned in unison with the pointer 62 and with the chart 9 being, like them, operated from the main drive shaft 37. Mounted on and having screwthreaded engagement with the lead screw 79 is a follower block 89 (Figure 4) provided in its outer end with a recess 90 which receives the bar 85. The follower block will, therefore, be caused to travel in one direction or the other over the lead screw 79 and bar 85 according to whether the machine is being used for measuring or whether the mechanism is being returned to the zero position. At the end of the resetting operation, the follower block 89 will engage collar 87 and move the bar 85 outward or toward the left, as shown in Figure 7. This operates to move the dog 70 to a position to be engaged by the shoulder 69 on the cam disk 67. This operation is effected by the following mechanism.

The dog 70 is pivotally mounted at 91 on a bracket plate 92 (Figures 1 and 8) which in turn is mounted on the frame plate 15. Pivotally mounted at 93 Fig. 7 on the bracket plate 92 is a lever 94, the upper end of which is adapted to bear against the outer edge of the dog 70, as shown more clearly in Figure 1, and which has an arm 95 projecting from its lower end beyond the pivot 93, as shown by Figure 7, which engages in a recess 96 formed on the inner side of the bar 85 at the inner end thereof. Assuming the parts to be in the position shown in Figure 1 with the dog 70 in engagement with the shoulder 69, and assuming further that a measuring operation is started, the cam surface 68 of the disk 67 (Figure 1) will engage the end of the dog 70 and move it outward beyond the path of movement of the shoulder 69. In the measuring operation, the cam disk 67 moves clock-wise. At the end of the measuring operation when the reset plate 52 is pressed in to move the clutch disk 40 outward to separate the clutch members 56 and 57, the spring 22 of the chart roller 21 which has been placed under tension by winding the chart 9ᵃ on roller 20, will now cause the gearing actuating the chart rolls and pointer 62, to move in the reverse direction, and the disk 67 to move in the anti clockwise direction. This movement of the parts continues until the follower block 89 engages collar 87 to move the bar 85 outward or toward the left in Figure 7. This movement of the bar causes the outer shoulder of recess 96 to engage the arm 95 and to turn the lever 94 into engagement with the dog 70 which moves said dog into the path of rotation of shoulder 69 so that when said shoulder again reaches the point in its rotation, shown in Figure 1, it will engage the end of the dog 70 and arrest further movements of the parts. This occurs, as shown, when the pointer 62 is at the zero position.

At the end of the measuring capacity of the machine, the follower block 89 will engage collar 88 and move the bar 85 inward or toward the right, as shown in Figure 7. This operates to move the dog 28 (Figure 9) to a position to be engaged by the shoulder 27 on the collar 26 of the measuring roller shaft 24. This operation is effected by the following mechanism.

Mounted on the frame plate 15 is a bracket 97 (Figures 2 and 7) on which is pivotally mounted at 98, a bell crank lever 99 having its upper end bent inwardly at right angles and provided with an adjusting screw 100, the end of which is directly in line with the inner end of the bar 85. Secured to the lower end of the bell crank lever 99 is a link 101, the lower end of which is connected to the dog 28 (Figure 9) intermediate its ends, the said dog being pivotally mounted at 102 on the frame plate 15.

In the measuring operation, as the limit of the capacity of the machine is nearly reached, which capacity, in the present instance, is one-hundred yards, at which time nearly all of the chart 9ᵃ will be wound upon the roller 20, the follower block 89 will engage the collar 88 and move the bar 85 toward the right in Figure 7. This will bring the inner end of said bar into engagement with the adjusting screw 100 and cause the bell crank lever 99 to be moved to the right, in Figure 7, or to the left in Figure 2, which operates to raise the free end of dog 28 into the path of movement of the shoulder 27 so that when these parts reach the position shown in dotted lines in Figure 9, the shoulder will engage the end of the dog and make it impossible to further rotate the measuring roller. This, as stated, arrests the machine at the end of the measurement of one-hundred yards and prevents the end of the chart 9ᵃ from being torn from its fastening on the roller 21.

It is one of the objects of the invention to provide means for automatically arresting the movement of the machine at any desired point within the limit of the capacity of the machine. For example, it may be desired to make a number of measurements of twenty yards. To enable this to be done, I provide an adjustable stop member 103 (Figures 4 and 12) which may be of any preferred construction, but as shown, comprises two arms pivotally connected at 104, the inner ends of which embrace the bar 85 and the upper arm 105 of which is adapted to engage the teeth of the rack bar portion 86 of said bar. The two arms are held in this position by means of a push spring 106 inserted between them beyond the pivot point. The stop member is inserted through an elongated recess 107 in the rectangular portion 2 of the casing and through a corresponding slot in the side plate 17. The upper member 105 is shown provided with a lug 108 which limits the inward movement of the stop member and which also acts as a pointer to co-operate with a series of numbers 109 arranged on the casing along the top of the slot 107 to indicate yard measurements from zero to one-hundred.

It will readily be seen that by pressing together the outer ends of the two arms of the stop member, the same can be moved to any adjusted position on the rack bar 86. In Figure 12, it is shown with the pointer 108 indicating twenty yards. When so positioned, in the measuring operation, when the collar 87 in its movement, caused by the lead screw 79, engages the stop member 103, the bar 85 will be moved inward to arrest further movement of the machine. This operation may be repeated after resetting the machine so that any desired number of measurements of twenty yards can be effected.

In a machine of the character herein described, it is customary to employ a knife for slitting the fabric, if desired, at the end of a measuring operation, and in a machine constructed according to my invention, the pressing of this knife to slit the fabric operates to raise the presser roller out of engagement with the fabric, in which upward position it is held by a spring-controlled pawl 132. A push plate 133 is employed to release the presser roller at will and a spring 130 operates to force the released roller into engagement with the measuring roller, or the fabric thereon. In the operation of resetting the machine when the lower portion of the push or clutch plate 47 is turned inward by the pressure on the thumb plate 52, a dog 119 engages the said plate and holds the clutch member separated until means are actuated to release the dog from such engagement when the spring 54 (Figure 7) operates to throw the clutch member 57 into engagement with the clutch member 56.

According to my invention I employ a plurality of means for releasing the clutch-holding dog 119, one means being operated on the release of the presser roller, and the other by actuating the knife. The mechanism referred to will now be described.

Pivotally mounted at 110 Fig. 2 on a casting 111 which in turn is mounted on the base 13 (Figs. 7 and 8) is a knife lever 112 which is provided at its outer end with a thumb plate 113 which works in a slot 114 in one side of the rectangular portion of the casing. The said knife lever has a rearwardly projecting end 115 on which is mounted an inwardly projecting arm 116 which projects through a curved slot 117 in the casting 111. Pivotally mounted at 118 (Figure 2) on the side of the frame plate 14, is a dog 119 provided on one side of the pivot with a recess 120 adapted to engage the bottom of the clutch plate 47 and on the other side of the pivot, having an arm 121, the outer end of which is positioned immediately over the arm 116 mounted on the rear end of the knife lever. Beyond the recess 120, the dog 119 has an abutment 122 which is normally in engagement with the bottom of the clutch plate. A coil spring 123 secured at one end to the arm 121 and at the other to a pin 124 on plate 14 operates to hold the abutment 122 in engagement with the bottom edge of the clutch plate 47. When the lower portion of the clutch plate is moved inward by pushing on the thumb plate 52, the engagement of its lower edge with the surface of abutment 122 will operate to turn dog 119 on its pivot and raise the arm 121 against the resistance of spring 123. As soon as the edge of plate 47 passes off of the abutment, the spring 123 pulls arm 121 downward and the shoulder of recess 120 engages over the bottom edge of clutch plate 47. This position of the parts is shown in Figure 5. Thus as long as the parts are in the position described, the two clutch members remain opened and no measuring operation can be effected. One way of releasing the dog 119 is through the medium of the knife lever 112. It will readily be seen that by pressing the knife lever, the arm 116 will engage the under side of arm 121 and raise the same thereby carrying the shoulder of recess 120 out of engagement with the bottom edge of clutch plate 47 whereupon the spring 54 will force the thumb plate 52 and the lower part of the clutch plate 47 outward to restore the clutch to operative position, and when the knife lever is returned to its uppermost position, spring 123 again pulls arm 121 downward and turns abutment 122 into engagement with the lower edge of clutch plate 47. The knife lever 112 (Figure 8) is retracted after depression by a coil spring 125 secured at one end to the knife lever and at its other end to the upper end of a post 126 mounted on the base 13 toward the rear end of the same. Another way of operating dog 119 to release the clutch mechanism is, as stated above, through the presser roller 12, shown in Figure 10. This presser roller is rotatably mounted on a shaft projecting from an arm 127 formed integral with a bar 128 which is pivotally mounted at one end in the frame plate 15 and at its other, in the frame plate 18. The bar 128 has a projecting arm 129 which is engaged by the end of a coil spring 130 which is coiled about the bar 128 and after being placed under tension, its other end is secured to the plate 18. The pressure of the spring on the arm 129 operates normally to force the arm 127 and roller 12 downward to cause the presser roller 12 to frictionally engage the fabric inserted between it and the measuring roller 11. Pivotally mounted on a vertically disposed pivot 131 is a dog 132 (Figure 11) provided with a push plate 133 and having on its inner edge a notch 134 which is adapted to engage over the upper edge of arm 129. The arm 129, as shown by dotted lines in Figure 2, is adapted to be engaged by a shoulder 135 on the lower edge of the knife lever 112 to turn the bar 128 and thereby raise the presser roller 12. When this is done, the dog 132 which is actuated by a spring 136 one end of which is secured to said dog and the other to a frame member of the machine (Figures 4 and 10), moves to the left in Figure 10 to cause the notch 134 to engage over the arm 129 to hold the presser roller in its elevated position against the resistance of spring 130. The bar 128 has a projection 137 which extends through the frame plate 15, Figures 2, 5 and 10. Secured in the outer end of the projection 137 of bar 128 is an arm 138 having a lower curved end 139 Fig. 9 which passes under and beyond the arm 121 of dog 119. With the presser roller 12 in its elevated position, and fabric to be measured having been inserted in the pass 10 between rollers 11 and 12, the roller 12 is released by the operator pressing inward the push plate 133 which removes the notch 134 from engagement with arm 129 and permits spring 130 to exert its pressure to lower the presser roller in the manner previously described. In this operation, the upwardly curved portion 139 of arm 138 will be moved into engagement with the under side of arm 121, thereby raising the same and releasing the shoulder of recess 120 from engagement with the lower edge of the clutch plate 47 (Figures 2 and 5) and thereby permit the engagement of the clutch members 56 and 57 to occur through the action of the spring 54.

After the machine has been reset, and with the clutch members still disengaged, the re-engagement of the clutch members can be effected either by depressing the knife lever 112 or by releasing the presser roller by pushing in the push plate 133. This is a feature of considerable importance for the reason that frequently the operator will neglect to reset the clutch by depressing the knife lever before inserting the goods between the rollers. Having so inserted the goods and released the presser roller, and then finding that the machine did not operate, if the release of the presser roller did not serve to release the clutch plate, as described above, it would be necessary for the operator to pull the goods out of the machine to avoid notching the same by pressing the knife lever.

With my improvement, it will be obvious that even if the operator has failed to reset the clutch by pressing down the knife lever as soon as she releases the presser roller, the clutch will be automatically reset by the action of the arm 139 on arm 121, as described above. As both of these manipulations are normal to the operation of the machine, and the lowering of the presser roller is a pre-requisite to a succeeding measuring operation, the invention insures the return of the indicating mechanism to zero after one operation and prior to a succeeding one.

Finally, a leading feature of the invention is the provision of a chart which for a given length of measurement, say, twelve yards, will provide length indications as well as computations for yards and fractional parts of a yard up to such limit of measurement, and thereafter will contain indications of measurement only for up to, say, one-hundred yards, thus enabling the machine to be used not only in retail work in measuring and indicating the length and cost of goods measured, but also in wholesale work where relatively great lengths of goods have to be measured, and in stock-taking work where all the remnants and bolts of fabric in stock must be measured. It would impracticable, in a machine of a commercial size, to provide computations for measurements up to one-hundred yards, nor is this desirable, but it is extremely desirable to have a machine which will indicate measurements and costs up to a length which, on the average, is rarely exceeded in retail sales, say, twelve yards, and thereafter will indicate measurements only, the provision of a chart indicating measurements up to one-hundred yards or more being a matter of no difficulty.

Figure 3:
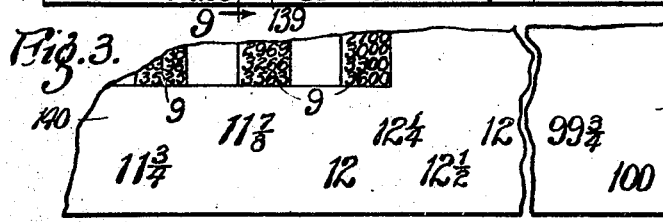
Figure 3 is a view showing a portion of a chart constructed according to my invention.

With the above object in view, I provide the chart 9ª (Figure 3) with the columns of computations 9 terminating on one side of the chart short of the bottom or inner edge thereof, and in the space 140 thus provided, I arrange a series of numbers located to indicate measurements of yards and fractions of a yard from one to one-hundred. To conserve space, these numbers are arranged in staggered relation and are displayed through a window 141 provided in the casing at the lower end of the opening 4 at the right of the machine, as the same is positioned for use, or at the bottom side thereof, as shown in Figure 1. To facilitate the reading of these numbers, I place a colored plate of glass, transparent celluloid or the like, 142, under the window, providing a rectangular space 143, and centrally of either end of said space, pointers 144. As either number appears in the space 143 opposite one or the other of the pointers 144, not only can it readily be seen, but by moving the chart until the number is positioned opposite a pointer, accurate measurements may be indicated. At the same time, the numbers on either side of the number indicated, as shown by Figure 1, can readily be seen through the colored plate 142; and thus the operator will have no difficulty in determining in what direction the chart is moving. This is a great aid to rapid manipulation of the machine.

I claim:—

1. In a fabric measuring machine, in combination with a measurement indicator and spring-resisted mechanism for operating the same, a clutch being included in said mechanism, means for opening said clutch to permit the spring to return the indicator to zero, automatic means cooperating with the clutch opening means to hold the clutch open until the indicator has returned to the zero position, a pivotally mounted knife for slitting the fabric at the end of a measuring operation, and means on said knife for releasing the said holding means when the knife is actuated.

2. In a fabric measuring machine, in combination with a measurement indicator and spring-resisted mechanism for operating the same, a clutch being included in said mechanism, means for opening said clutch to permit the spring to return the indicator to zero, a spring-controlled dog operating automatically to engage said means and thereby hold the clutch open until the indicator has returned to the zero position, and an arm on said knife operating to engage and release said dog when the knife is actuated.

3. In a fabric measuring machine, in combination with a measurement indicator and spring-resisted mechanism for operating the same, a clutch being included in said mechanism, a pivoted clutch plate movable for opening said clutch to permit the spring to return the indicator to zero, a pivotally mounted spring-actuated dog positioned to automatically engage said clutch plate when the clutch is opened, to hold the clutch in such position until the indicator has returned to the zero position, a pivotally mounted knife for slitting the fabric at the end of a measuring operation, and an arm on said knife adapted to engage and turn said dog out of engagement with the clutch plate when the knife is operated.

4. In a fabric measuring machine having a measuring roller, a measurement indicator and spring-resisted mechanism for operating the same from said roller, a clutch being included in said mechanism, a pivotally mounted presser roller co-operating with and above said measuring roller, to cause the latter to be rotated when fabric is pulled between the rollers, means for raising said presser roller to permit the insertion of fabric between the rollers, means for lowering said presser roller, means for opening said clutch to permit the spring to return the indicator to zero after a measuring operation, automatic means operating to hold the clutch open until the indicator has returned to the zero position, and means operated by lowering said presser roller to release said clutch-holding means.

5. In a fabric measuring machine having a measuring roller, a measurement indicator and spring-resisted mechanism for operating the same from said measuring roller, a clutch being included in said mechanism, a presser roller co-operating with and above said measuring roller, a pivotally mounted knife for slitting the fabric at the end of a measuring operation, means adapted to be engaged by said knife in its cutting movement to raise the presser roller, means actuated at will for effecting the lowering of the presser roller, means for opening said clutch to permit the spring to return the indicator to zero, automatic means operating to hold the clutch open until the indicator has returned to the zero position, and means actuated in the lowering of said presser roller for releasing said clutch-holding means.

6. In a fabric measuring machine having a measuring roller, a measurement indicator and spring-resisted mechanism for operating the same from said measuring roller, a clutch being included in said mechanism, a pivotally mounted frame carrying a presser roller above and for co-operation with the measuring roller, means for turning said frame to raise the presser roller, means for turning said frame to lower the presser roller, means for opening said clutch to permit the spring to return the indicator to zero, a spring-actuated pivoted dog operating to engage the clutch-operating means to hold the clutch open until the indicator has returned to the zero position, and an arm on the presser roller frame adapted to engage and release said dog when the frame is turned to lower the presser roller.

7. In a fabric measuring machine having a measuring roller, a measuring indicator and mechanism for operating the same from said measuring roller, a stop movable with said roller, a pivotally mounted dog movable into the path of said stop, means for so moving said dog, a lead screw rotated from said mechanism in the operation of the machine, a follower block mounted thereon and movable in a given direction thereby in the measuring operation, a slidably mounted bar movable to engage and operate said dog-actuating means, and a stop on said bar adapted to be engaged by the follower block at the termination of a predetermined length of measurement to move said bar into engagement with said dog-actuating means and thereby raise said dog into the path of the measuring roller stop to prevent further rotation of the roller.

8. In a fabric measuring machine having a measuring roller, a measurement indicator and mechanism for operating the same from said measuring roller, a stop movable with said roller, a pivotally mounted dog movable into the path of said stop, a bell crank lever, a link connecting one arm of said lever with said dog, a lead screw rotated from said mechanism in the operation of the machine, a follower block mounted thereon and movable in a given direction thereby in the measuring operation, a slidably mounted bar movable to engage the other arm of said bell crank lever, and a stop on said bar adapted to be engaged by the follower block at the termination of a predetermined length of measurement to move said bar into engagement with said bell crank lever and thereby raise said dog into the path of the measuring roller stop to prevent further rotation of the roller.

9. In a fabric measuring machine having a measuring roller, a measurement indicator and mechanism for operating the same from said measuring roller, a stop movable with said roller, a pivotally mounted dog movable into the path of said stop, means for so moving said dog, a lead screw rotated from said mechanism in the operation of the machine, a follower block mounted thereon and movable in a given direction thereby in the measuring operation, a slidably mounted bar movable to engage and operate said dog-actuating means, an adjustable stop on said bar adapted to be engaged by the follower block at the termination of a predetermined length of measurement to move said bar into engagement with said dog-actuating means and thereby raise said dog into the path of the measuring roller stop to prevent further rotation of the roller.

10. In a fabric measuring machine having a measuring roller, a measurement indicator and mechanism for operating the same from said measuring roller, a stop movable with said roller, a pivotally mounted dog movable into the path of said stop, means for so moving said dog, a lead screw rotated from said mechanism in the operation of the machine, a follower block mounted thereon and movable in a given direction thereby in the measuring operation, a slidably mounted bar movable to engage and operate said dog-actuating means, a casing for said machine having a longitudinal slot and a measurement scale indicated thereon adjacent the said slot, and a stop inserted through said slot and adjustable on said bar to positions corresponding to different lengths of measurement, as indicated by said scale, whereby the follower block will engage said stop at the termination of a predetermined length of measurement to move said bar into engagement with said dog-actuating means and thereby raise said dog into the path of the measuring roller stop to prevent further rotation of the roller.

11. In a fabric measuring machine having a measuring roller, a measurement indicator, mechanism for operating the same from said measuring roller, and mechanism for resetting the indicator to the zero position, a cam disk movable with said indicator and having a shoulder, a pivotally mounted dog, a lead screw rotated from said operating mechanism in the operation of the machine, a follower block mounted thereon and movable in one direction in the measuring operation, and in the opposite direction in the resetting operation, a slidably mounted bar, a pivoted lever having one end engaged by said bar and its other positioned to engage said dog to move the same into the path of said shoulder, and a stop on said bar adapted to be engaged by the follower block near the termination of the resetting operation, to move said bar and thereby turn said lever to cause it to move said dog into the path of said shoulder to arrest the indicator at the zero position, said dog being movable out of the path of said shoulder in the measuring operation by engagement therewith of the cam of said disk.

12. In a fabric measuring machine having a measuring roller, a measurement indicator, mechanism for operating the same from said measuring roller and mechanism for resetting the indicator to zero, a member adapted to prevent further movement of the measuring mechanism at the termination of a given length of measurement, a member adapted to arrest further movement of the mechanism when the indicator has been returned to the zero position, a lead screw rotated from said operating mechanism in the operation of the machine, a follower block mounted thereon and movable thereby in one direction in the measuring operation, and in the opposite direction in the resetting operation, a slidably mounted bar, stops on said bar at opposite sides of said follower block and adapted to be engaged thereby at the termination of its movement in either direction to move said bar in one direction or the other, and means associated with said bar and adapted to be actuated thereby to operate the one or the other of said members to stop the machine, according to whether the end of a given length of measurement has been reached, or the indicator has reached the zero position in the resetting operation.

In testimony whereof, I have hereunto set my hand.

JOHN L. WHEELER.